United States Patent [19]
Sloot

[11] Patent Number: 6,139,928
[45] Date of Patent: Oct. 31, 2000

[54] THREE-DIMENSIONAL APPLIQUE

[75] Inventor: Alexander Sloot, Sugarloaf, Pa.

[73] Assignee: Printmark Industreis, Inc., Hazleton, Pa.

[21] Appl. No.: 09/099,249

[22] Filed: Jun. 18, 1998

[51] Int. Cl.[7] .................................................. B32B 3/16
[52] U.S. Cl. .............................. 428/7; 428/900; 428/913; 428/914; D5/63; 156/284; 156/295
[58] Field of Search .............................. 428/7, 914, 900, 428/913; D5/63; 156/284, 295

[56] References Cited

U.S. PATENT DOCUMENTS

| | | | |
|---|---|---|---|
| Re. 35,245 | 5/1996 | Donsky | 428/79 |
| 368,124 | 8/1887 | Bennett . | |
| D. 386,065 | 11/1997 | Lewis | D8/354 |
| 1,375,857 | 4/1921 | Olney . | |
| 2,729,010 | 1/1956 | Markus | 41/34 |
| 3,484,974 | 12/1969 | Culmone | 40/129 |
| 3,608,092 | 9/1971 | Taranto | 2/49 R |
| 3,629,034 | 12/1971 | Kuroda | 156/219 |
| 3,756,888 | 9/1973 | Kuroda | 156/220 |
| 3,758,358 | 9/1973 | Kuroda | 156/222 |
| 3,777,310 | 12/1973 | Yang | 2/48 |
| 3,868,288 | 2/1975 | Ercolano | 156/248 |
| 3,931,425 | 1/1976 | Kuroda | 428/38 |
| 3,944,454 | 3/1976 | Burgheimer | 156/273 |
| 4,157,272 | 6/1979 | Kuroda | 156/219 |
| 4,160,685 | 7/1979 | Kuroda | 156/219 |
| 4,209,354 | 6/1980 | Kuroda | 156/219 |
| 4,226,902 | 10/1980 | Webb | 428/7 |
| 4,313,776 | 2/1982 | Urai et al. | 156/220 |
| 4,345,958 | 8/1982 | Kuroda | 156/221 |
| 4,495,230 | 1/1985 | Ellwein | 428/13 |
| 4,710,979 | 12/1987 | Bull | 2/48 |
| 4,772,503 | 9/1988 | Donsky | 428/79 |
| 4,815,149 | 3/1989 | Erhardt et al. | 2/243 B |
| 4,837,864 | 6/1989 | Thill | 2/244 |
| 4,838,965 | 6/1989 | Bussard | 156/83 |
| 5,048,123 | 9/1991 | Monson | 2/69 |
| 5,079,778 | 1/1992 | Sloot | 2/69 |
| 5,169,701 | 12/1992 | Sander | 428/79 |
| 5,222,259 | 6/1993 | Bristor | 2/115 |
| 5,251,337 | 10/1993 | Sloot | 2/243.1 |
| 5,264,063 | 11/1993 | Martin | 156/247 |
| 5,264,172 | 11/1993 | Rosica et al. | 264/132 |
| 5,292,255 | 3/1994 | Goldwasser | 434/84 |
| 5,458,231 | 10/1995 | Belokin et al. | 206/45.14 |
| 5,512,226 | 4/1996 | Rosica | 264/132 |
| 5,514,317 | 5/1996 | Rosica et al. | 264/132 |
| 5,560,491 | 10/1996 | Romaniuk et al. | 206/573 |
| 5,636,385 | 6/1997 | Harrison | 2/244 |

*Primary Examiner*—Margaret Medley
*Attorney, Agent, or Firm*—St. Onge Steward Johnston & Reens LLC

[57] ABSTRACT

A three-dimensional applique is provided having a preformed, flexible layer with a decoratively shaped perimeter and a molded relief pattern with raised and lowered portions, the raised portions extending a substantial distance from the plane in which lowered portions and/or raised portions lie, a substantially flat backing layer, and a peripheral seal forming an airtight pocket between the preformed layer and the backing layer. Appliques, stickers, magnets, and tags are also provided having encapsulated materials, such as sound, music or light-up modules. Methods for manufacturing three-dimensional appliques, and articles of clothing, stickers and magnets having three-dimensional appliques are also provided.

26 Claims, 4 Drawing Sheets

THREE-DIMENSIONAL APPLIQUE

FIELD OF THE INVENTION

The invention relates to three dimensional appliques for articles of clothing, stickers, magnets and tags. More specifically, the invention relates to three dimensional appliques having a preformed layer with a relief pattern having at least one raised portion, at least one lowered portion surrounding the raised portion and at least one wall substantially perpendicular to the plane in which the raised portion and/or the lowered portion lies, the applique further having at least one substantially flat backing layer, and a peripheral seal area, the preformed layer, backing layer and seal area forming an airtight pocket.

BACKGROUND OF THE INVENTION

Conventional appliques tend to be rigid plastic appliques, or are flexible plastic appliques having valves or other devices for introducing and trapping air, or appliques formed from flexible materials that must be formed directly on a substrate with a foam material between the substrate and the flexible layer for providing a three-dimensional relief pattern.

A disadvantage of conventional appliques is that they may tend to delaminate from their substrates, are difficult to adhere to thick, highly piled, fluffy or knitted fabrics, such as wool or wool blend fabrics, or collapse after being applied to the substrate when used. This tendency to delaminate from the clothing substrate during laundering, or to exhibit reduced adhesion strength when fixed to substrates is primarily due to the fact that preformed appliques typically comprise a single layer of plastic only.

A disadvantage of conventional appliques made of flexible materials is that they tend not to be provided with relief patterns having raised portions that extend laterally a substantial distance from lowered portions of the relief pattern. In addition, conventional appliques tend not to be provided with relief patterns having walls between raised and lowered portions of the relief pattern that are substantially perpendicular to raised portions and/or lower portions. Thus, without these two features, in particular, conventional appliques cannot be provided in a variety of intricate patterns or shapes.

A further disadvantage of conventional appliques is that they typically cannot be provided with a patterned or printed backing layer or cannot be filled with encapsulated material, such as decorative or loose substances, visible through the three-dimensional top layer or filled with other encapsulated material, such as noise makers, squeakers, or electronic parts, such as sound, music or light-up modules. Moreover, printing on conventional thermoformed appliques tends to distort, and, therefore, is limited to simple printed designs and must be done using pre-distortion printing.

Still another disadvantage of conventional three-dimensional appliques applied to articles of clothing is that they tend to fill with dirt and debris, and even water, which may take time to dry out. As a result, bacteria may accumulate in such conventional three-dimensional appliques. Even further, conventional three-dimensional appliques made from rigid plastics, if compressed, do not readily return to their original three-dimensional shape. In fact, they may be damaged and even crack when compressed. Conventional three-dimensional appliques made of rigid materials tend to be inelastic or inflexible, uncomfortable to wear, and incapable of bending back onto themselves.

Conventional appliques that are made of flexible materials that are inflatable tend to require expensive valves to inflate them, and typically cannot bend back onto themselves. The shapes in which inflatable appliques can be provided tend to be limited in that they need to be provided in large, chunky designs (i.e., designs that do not require intricate detailing), or are limited to those shapes or designs which do not lose their shape when inflated. For example, an applique having a large cross section would tend to puff out significantly in its middle when inflated, causing the edges to pull in and distort. Thus, the shape or design of larger conventional inflatable appliques tends to be distorted, and, therefore, limited to less detailed or less intricate shapes and designs.

Conventional appliques made of flexible materials that are filled with foam or other material for providing the three-dimensional or puffy shape generally cannot be provided so that a decorative or patterned backing or other encapsulated decorative material is visible through the top layer. Further, conventional appliques made of flexible materials typically have relief patterns with walls that taper down from the raised portion to the lower portions or seal area, not walls that extend substantially perpendicular to the lower portions or seal area, and typically do not have relief patterns wherein the upper portion extends a substantial distance from the lower portion. In addition, foam-filled appliques tend to be resistant to folding onto themselves, and therefore less preferred.

U.S. Pat. No. 3,868,288 to Ercolano discloses a three-dimensional applique having only one substantially flat layer that is compressible. In particular, Ercolano discloses a compressible applique vacuum formed from a substantially flat layer while being sealed to the substrate having a relatively simple relief pattern that does not extend a substantial distance from the seal area or raised portion, and that does not have substantially vertical walls. Ercolano discloses a complex method of manufacturing the applique whereby a thermoplastic layer is heated to its softening point while vacuum forming and sealing it to a backing layer, and a substrate.

Ercolano does not disclose a preformed flexible layer, a preformed layer having a relief pattern with at least one raised portion that extends laterally a substantially distance from the plane in which the lowered portion or seal area lies, or a preformed layer having a relief pattern with a raised portion, a lowered portion and a wall substantially perpendicular to the plane in which the lowered portion and/or the raised portion of the relief pattern lies. While Ercolano discloses a backing layer of fluid-impermeable material in between the substrate 2 and the substantially flat layer 3, before the latter is vacuum-formed and bonded to the substrate 2, an applique having a backing layer cannot be made by the process disclosed in Ercolano. The vacuum pressure applied on one side of two fluid impermeable thermoplastic layers would necessarily draw both layers into the vacuum. Thus, an applique without an airtight pocket would necessarily result from the process disclosed in Ercolano. In addition, Ercolano discloses preheating the vinyl layers so they become soft and rubbery, or to a temperature of between about 250° F. and 300° F. Because vinyl fuses together at about 250° F., both layers will not only draw up into the die, but also will likely fuse together thereby prohibiting any airtight from forming. This prevents moreover, the inclusion of encapsulated material between the layers.

The Ercolano process further requires a cooling step before removing the applique from the sealing/vacuum-forming apparatus. The cooling step required by the Ercolano process would slow down the manufacturing time, and, accordingly, increase manufacturing costs, considerably.

While Ercolano discloses using compressed air to eject the applique from the mold, this cannot be done unless the applique has cooled considerably, or the applique will not retain its newly formed shape. The cooling time that would typically be required before the applique could be removed from the sealing/vacuum-forming apparatus would be from about thirty to about sixty seconds or more. Moreover, the radio-frequency sealing process disclosed in Ercolano necessarily heats the entire applique assembly, thereby requiring additional cooling before the applique is released. In addition, the process in Ercolano requires that a single garment with an applique be made at a time, further limiting manufacturing efficiencies.

The applique disclosed in Ercolano cannot have a fabric covered vinyl top layer. Ercolano requires conventional vinyl "tear-sealing" (i.e. the automatic cutting away of excess vinyl while the applique is being formed and sealed to the garment). When a fabric covered top layer is used, the applique will need to be die cut before it can be sealed to the garment because tear-sealing will not work on fabric covered vinyl. In addition, the applique and process disclosed in Ercolano, with the excessive heating required, does not allow for the inclusion of electronics into the applique, such as sound, music or light-up modules.

What is desired, therefore, are three-dimensional appliques having a preformed flexible layer with a relief pattern with raised and lowered portions, and a wall formed between a raised portion and a lowered portion and being substantially perpendicular to the plane in which the raised and/or lowered portion of the relief pattern lies. What is further desired are appliques having raised portions extending a substantial distance from the seal area or lowered portion, that are easily compressible, foldable and bendable, that are thick in the seal areas so as to adhere well to substrates, fleece, wool and other difficult to adhere to materials and clothing, and that are constructed of multiple layers so that a variety of complicated printing, patterns, profiles, perimeters or shapes can be provided. What is still further desired are three-dimensional appliques that are capable of being filled with loose or decorative material, that retain their shape or spring back when depressed, yet are comfortable to wear, and that are inexpensive. What is even further desired, therefore, is a method of making three-dimensional appliques, including making an array of three-dimensional appliques at one time, where the appliques have a backing layer, and can be provided with intricate designs and printing and loose decorative fill.

SUMMARY OF THE INVENTION

Accordingly, it is an object of the invention to provide a three-dimensional applique having a relief pattern with at least one raised portion and at least one lowered portion, the raised portions extending a substantial distance from the plane in which the seal area or lowered portion lies so as to form a single or multi-planar applique in a variety of intricate patterns.

Another object of the invention is to provide a three-dimensional applique having a relief pattern with at least one raised portion, at least one lowered portion, and at least one wall formed between the raised and lowered portions, the wall being substantially perpendicular to the plane in which the raised portion and/or the lowered portion lies.

Yet another object of the invention is to provide a three-dimensional applique having a thick seal area so as to provide an applique that adheres well to thick, fluffy or other difficult-to-adhere-to materials, such as jersey, interlock, fleece, most fabrics, wool or wool blends, and articles of clothing.

Still another object of the present invention is to provide a three-dimensional applique having encapsulated material.

Still yet another objective is to create an applique that can accommodate an electronic part, such as a sound, music or light-up module.

It is another object of the present invention is to provide a three-dimensional applique that is soft and compressible, but that is capable of springing back to its original shape, yet is flexible enough to be folded.

Still yet another object of the present invention is to provide a three-dimensional applique that does not accumulate dirt, bacteria, or other contaminants when laundered or exposed to water.

Yet a further object of the invention is to provide a relatively inexpensive three-dimensional applique.

Still another object of the invention is to provide a three-dimensional applique having a flocked outer surface.

Still another object of the invention is to provide an applique with a fabric-laminated outer surface with or without printing.

Yet still a further object of the invention is to provide a three-dimensional applique having a preformed layer and a substantially flat backing layer attached to each other forming an airtight therebetween so that the applique is capable of springing back to its original shape when compressed.

An even further object of the invention is to provide a three-dimensional applique having a relief pattern with at least one raised portion extending laterally, in a single or multi-planar pattern, a distance of between from about ⅛ inches to about ½ or ¾ inches or more from the plane in which the lowered portion of the relief pattern lies.

Yet an even further object of the invention is to provide a three-dimensional applique having a backing layer or seal area that is relatively thick so that the applique adheres well to fleece, wool or other difficult to adhere to substrates.

Still yet an even further object of the invention is to provide an applique having a backing layer with a thickness of from about 0.005 inches to about 0.020 inches.

These and other objects of the invention are achieved by providing a preformed, flexible layer having a decoratively shaped perimeter and a relief pattern molded therein, the relief pattern having at least one raised portion, at least one lowered portion surrounding the raised portion, and at least one wall formed between a raised portion and a lowered portion, the wall being substantially perpendicular to the plane in which the lowered portion and/or the raised portion of the relief pattern lies, and at least one substantially flat backing layer that is fluid impermeable, said preformed layer and backing layer being sealed to one another at the lower portion thereby forming an airtight pocket. The three-dimensional preformed layer and backing layer can be transparent, reflective and said three-dimensional applique can include encapsulated material in the airtight pocket. Articles of clothing, stickers and magnets are also provided. In addition, a method of making three-dimensional appliques and an inexpensive method for applying the appliques to articles of clothing or creating, stickers and magnets is also provided.

The invention and its particular features and advantages will become more apparent from the following detailed description considered with reference to the accompanying drawings.

DETAILED DESCRIPTION OF THE INVENTION

Figure 1:
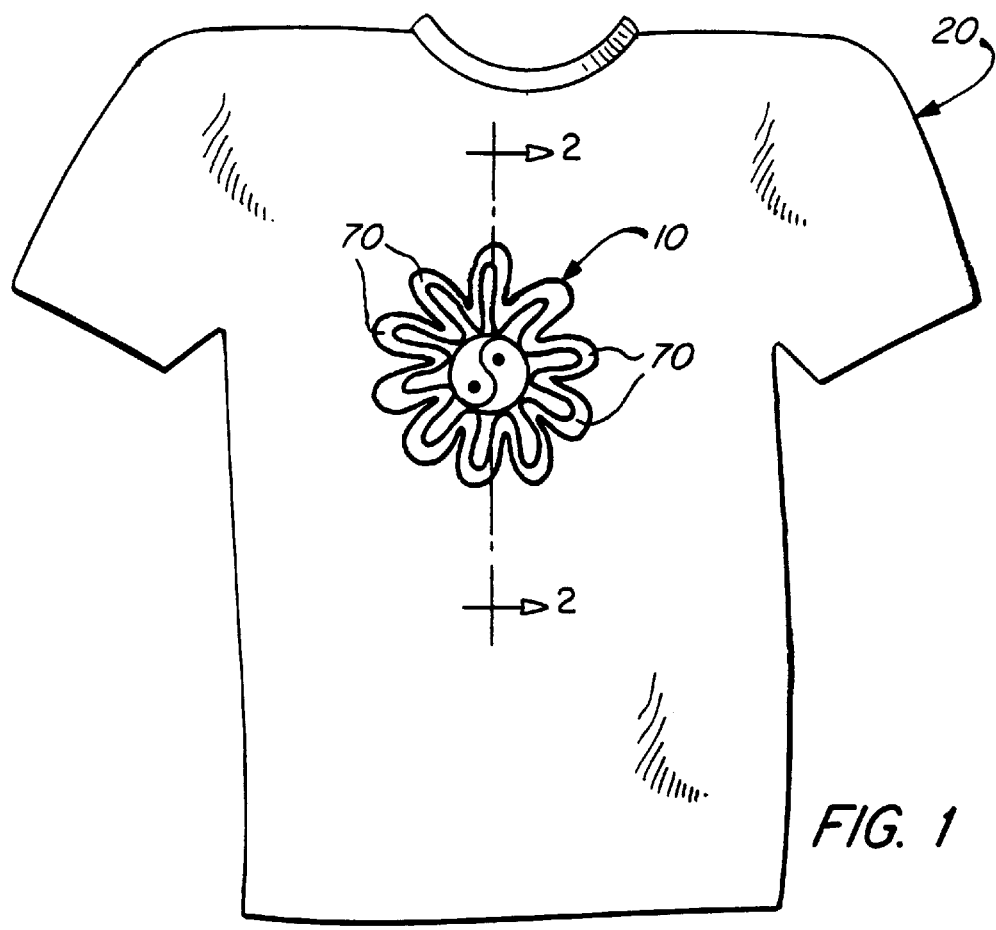
FIG. 1 is a front view of a three-dimensional applique on an article of clothing in accordance with the invention.

FIG. 1 shows a three-dimensional applique 10 of the invention applied to a substrate that is a T-shirt 20. It is understood that the applique 10 can be applied to a variety of substrates, including clothing, wool, stickers, hats, and magnets. It is understood that any article of clothing or other substrate may be used, in place of a T-shirt 20.

Figure 2:
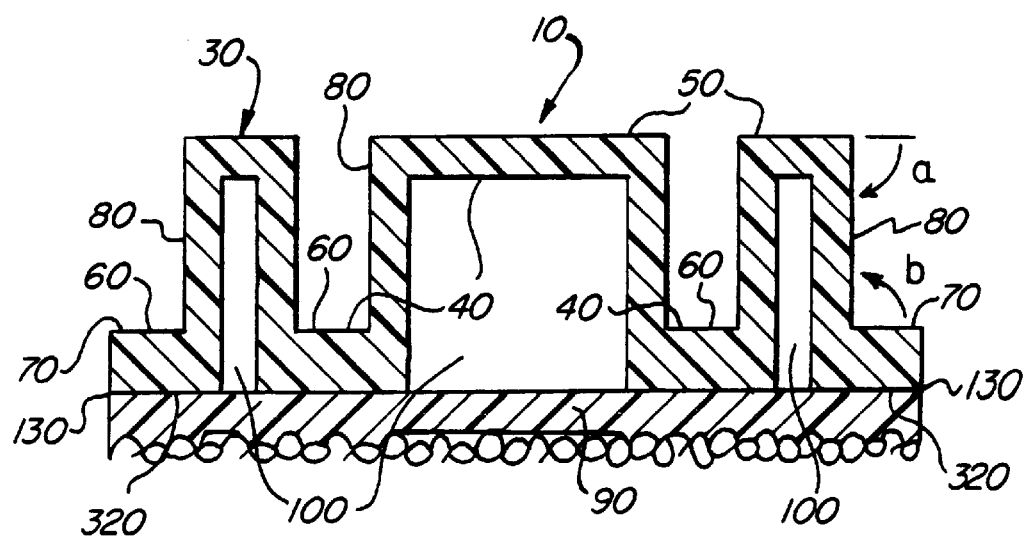
FIG. 2 is a cross-sectional view of the applique shown in FIG. 1 taken along line 2—2.

FIG. 2 shows a cross-section of the applique 10 of FIG. 1 taken along section line at 2—2. The applique 10 includes a preformed, flexible layer 30 having a decoratively shaped perimeter, and relief pattern 40 molded therein. The preformed, flexible layer 30 is typically made of 0.020 inches thick vinyl. The relief pattern 40 has at least one raised portion 50 and at least one lowered portion 60, and peripheral seal area 70 typically surrounding the raised portion 50. It is understood that the lowered portions 60 can be discontinuous, and can extend within the raised portion 50 and the seal area 70. The raised portion 50 of the relief pattern 40 can be single or multi-planar heights, therefore, and can extend a substantial distance laterally from the plane in which the lowered portion 60 and/or seal area 70 lies. Typically, the raised portion 50 extends a distance from about ⅛ inches to about ½ or ¾ inches or more from the lowered portions 60 and/or sealed area 70. The relief pattern 40 can have walls 80 that are substantially perpendicular to the plane in which the seal area 70 lies and/or raised portions 50. Thus, as shown in FIG. 2, the angles a and b, between wall 80 and the plane in which either or both the raised portion 50, or the lowered portion 60 or seal area 70 lies approximates 90°, and is at least about 45°.

It is preferred that the walls 80 be substantially perpendicular to the seal area 70 or lowered portions 60, however, it is understood that, depending upon the design desired, it may be preferable to have walls 80 that are substantially perpendicular to the planes in which the raised portions 50 lie.

A flexible, substantially flat backing layer 90 is disposed adjacent to the seal area 70 opposite the raised portion 50 of the relief pattern 40 and is fluid impermeable. The applique 10 has a peripheral seal 70 defined by the lowered portion 60 of the preformed layer 30 that surrounds the raised portion 50 of the relief pattern 40 and the flexible backing layer 90 thereby forming at least one airtight pocket 100 between the backing layer 90 and the preformed layer 30.

Figure 3:
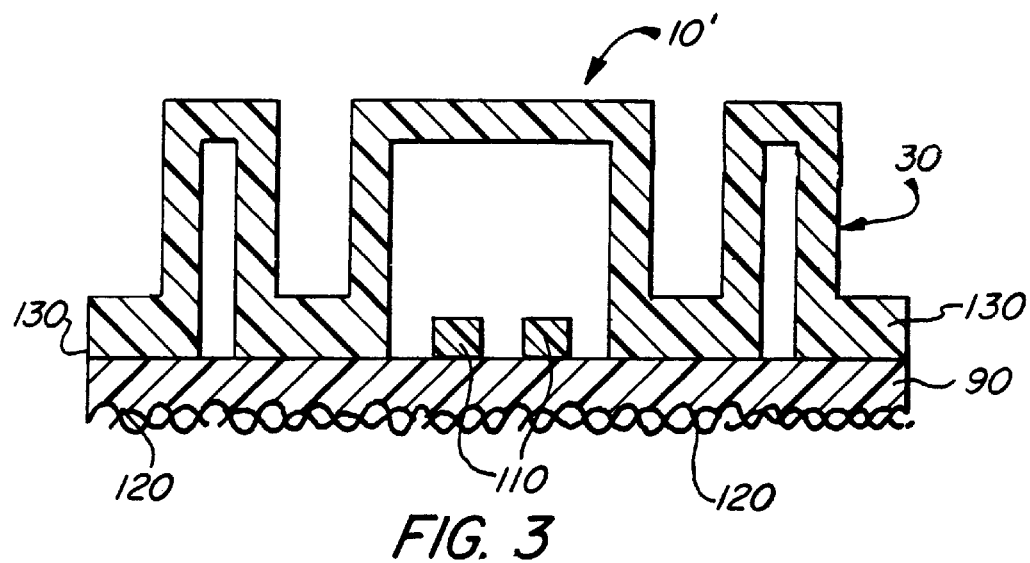
FIG. 3 is a cross-sectional view of another embodiment of the applique of FIG. 1.

FIG. 3 shows another embodiment of the three-dimensional applique 10' in accordance with the present invention. The three-dimensional applique 10' has encapsulated material 110 between the preformed layer 30 having the relief pattern 40, and the backing layer 90. The encapsulated material 110 shown in FIG. 3 is loose fill or decorative material. It is preferred that the preformed layer 30 be clear or transparent so that the encapsulated material 110 is visible. It is understood that encapsulated material 110 is meant to include any loose material, reflective material, powder, liquid or other decorative material, and may also include beads or hard materials that may make noise when shaken, squeakers and electronic parts, such as sound, music or light-up modules. It is further understood that the layers 30, 90 and encapsulated material 110 can be vinyl, reflective, holographic or printed. It is also further understood that the preformed layer 30 of appliques 10 or 10' can have a flocked or fabric covered outer surface.

Figure 2A:
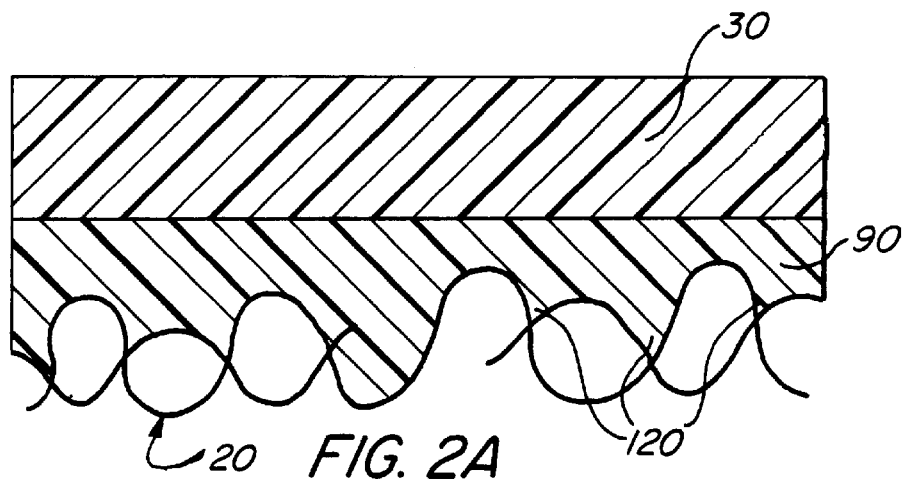
FIG. 2A is a magnified view of the seal area of FIG. 2.

FIG. 2A is a magnified view of the seal area 70 of FIG. 2. The seal area 70 has a thickness sufficient so as to flow into the interstices 120 of the substrate to form a strong bond. A strong bond is achieved for articles of clothing or T-shirts 20 where the backing layer 90 flows into the interstices 120 of the fabric substrate as shown in FIG. 2A. Typically the backing layer 90 can be provided with a thickness ranging from about 0.005 inches to about 0.020 inches. However, it is understood that the backing layer 90 can have any thickness, as long as the thickness of the layers 30 or 90, combined, is sufficient to provide a strong bond to the substrate. The applique 10 can also be provided with an adhesion promoter adjacent to the substantially flat backing layer 90 and article of clothing or T-shirt 20 opposite the preformed layer 30. A heat-activated film may be used as the adhesion promoter, and can be used as the backing layer 90. The heat-activated adhesive can include any thermoplastic that softens or flows at the sealing temperature of the preformed and backing layers 30, 90.

Figure 4:
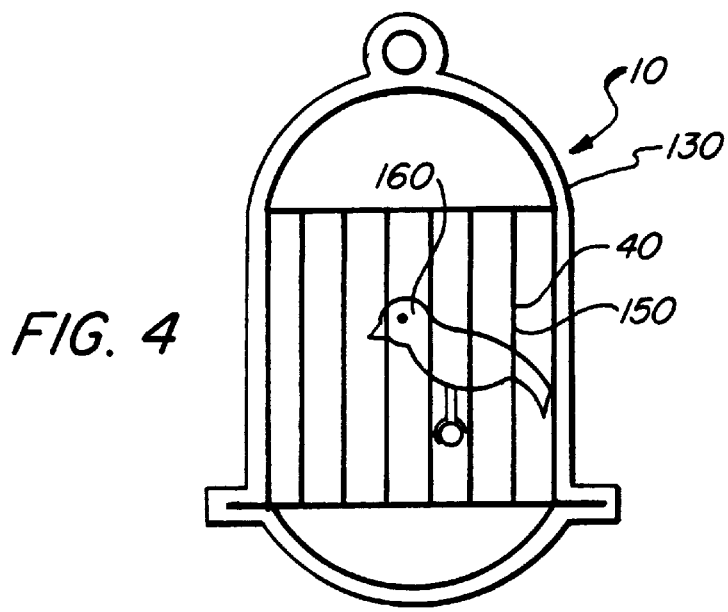
FIG. 4 is another variation of the embodiment of the applique of FIG. 1.

FIG. 3 shows a printed backing layer 90 and a transparent preformed layer 30. It is understood that the preformed layer 30 can be transparent or clear in all embodiments. It is preferred that the preformed layer 30 is transparent when the backing layer 90 is reflective, printed or otherwise decorative, as shown in FIG. 3 or when certain decorative encapsulated material 110 is encapsulated between the layers 30, 90, as shown in FIG. 3. For example, the backing layer 90 can be decorative so that if the preformed layer 30 is molded in the design of a flower, as shown in FIG. 1, then colors for the flower may be advantageously printed on the backing layer 90, and the whole design is thus enhanced. Printing the backing layer 90 is advantageous over printing the sheet thermoformed or vacuumed formed into the preformed layer 30. Thus, printing the backing layer 90 allows for appliques 10, 10', shown in FIGS. 1 and 4, having very colorful and complex designs to be made, at relatively low cost. A preformed layer 30 and/or the backing layer 90 may be printed for an even more complex applique 10, 10'. For example, as shown in FIG. 4, the preformed layer 30 can be molded to have a decoratively shaped perimeter 130 in the shape of a bird cage, and can have a relief pattern 40 in the profile of bars on the bird cage, and can be printed 150 (i.e., distortion printed) to highlight the vertical bars of the bird case. The backing layer 90 can be printed 160 with a bird so as to appear as though the bird is in the bird cage.

A further decorative effect can be achieved with a preformed layer 30 that is transparent or a frosty vinyl, and a backing layer 90 that is provided in a color and a seal area 70 and any lowered portion 60 sealed to the backing layer will appear as the color of the backing layer 90. Thus, if the backing layer 90 is a dark blue color, for example, and the preformed layer 30 is transparent, the design will appear as white to light blue in overall appearance and all sealed areas 70 and any sealed lowered portions 60 will appear dark blue. In addition, either layer 30 or 90 can be reflective, transparent and/or fluorescent in any embodiment of the invention.

Figure 5:
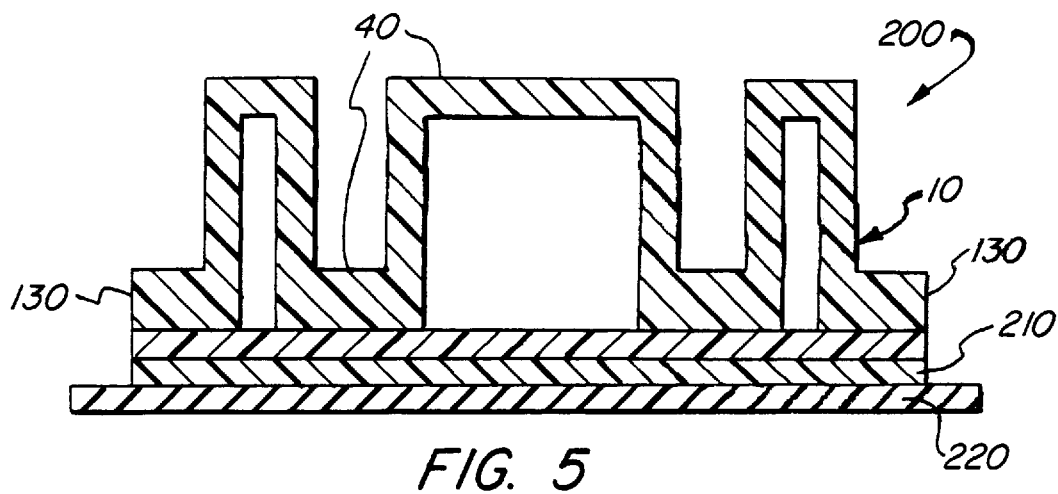
FIG. 5 is a cross-sectional view of another embodiment of the applique.

FIG. 5 shows a sticker 200 in accordance with the present invention. The sticker 200 has a three-dimensional applique 10, and an adhesive backing 210 having a release liner 220. It is understood that a variety of other substrates, instead of adhesive backing 210 and a release liner 220 can be used. For example, a three-dimensional magnet can be provided by using an applique 10, 10' with a magnet substrate.

A three-dimensional tag can also be provided having at least two preformed layers 30, and encapsulated material 110, a substantially flat backing layer 90 and printing 150, 160 on the layers 30, 90. It is understood that the three-dimensional tag may also include reflective, flocked materials, and fabric covered vinyl.

Figure 6:
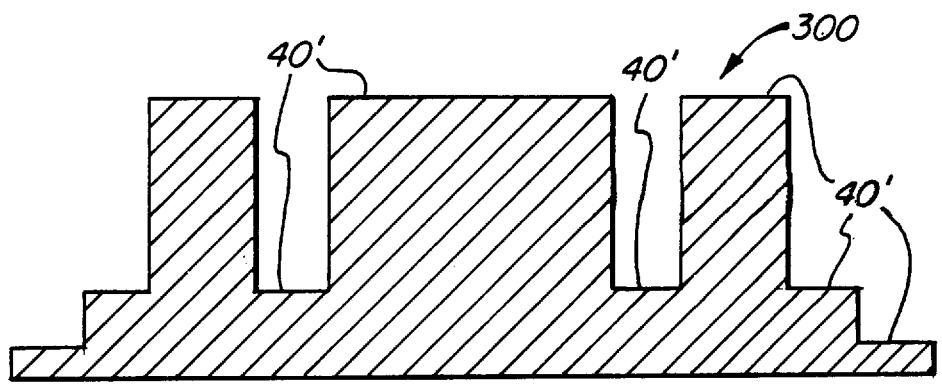
FIG. 6 is a cross-sectional view of a vacuum forming die for making the applique.
Figure 7:
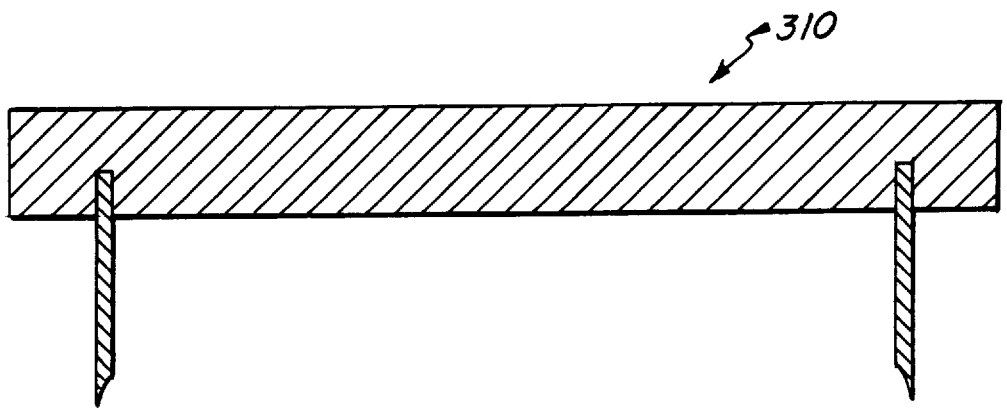
FIG. 7 is a cross-sectional view of a steel rule die for making the applique.
Figure 8:
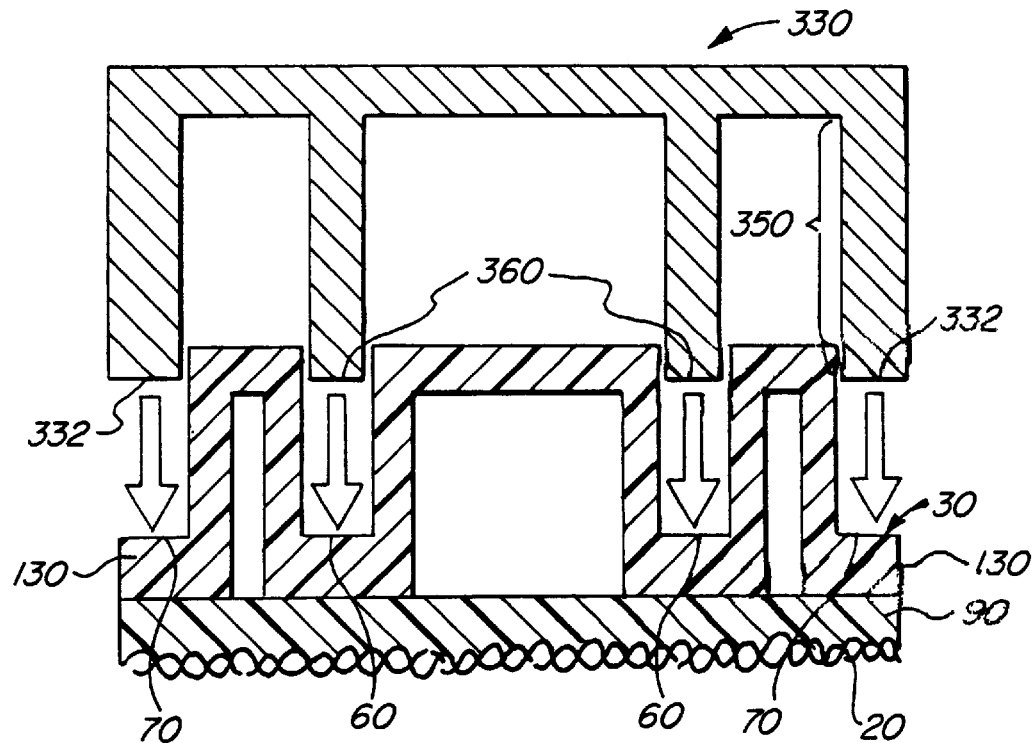
FIG. 8 is a cross-sectional view of a radio-frequency sealing die for making the applique having a pre-die cut, preformed, flexible layer.

FIGS. 6–8 depict dies used to make the appliques 10, 10' and the T-shirts 20 having appliques, stickers 200, tags and magnets of the present invention. The appliques 10, 10' are formed from a preformed plastic sheet material. A vacuum forming die 300, as shown in FIG. 6, is first used to vacuum form an array of three-dimensional relief patterns 40 for the preformed layer 30. A steel rule die 310, as shown in FIG. 7, is used to cut and separate preformed layers 30 from the sheet. The vacuum forming die 300 has areas 40' corresponding to relief pattern 40 of the layer 90.

The top surface of the preformed, flexible fabric may be formed from a sheet of covered vinyl, using the die 300 shown in FIG. 6 This may be printed with graphics and then pre-formed into its dimensional shaped by vacuum forming. This top layer 30 is then diecut with the steel rule die 310 simultaneously with backing layer 90 in a desired perimeter 130. When cutting the preformed layers 30 from the sheet, a flange area corresponding to the seal area 70 of a sufficient width for sealing to the backing layer 90 and subsequently, the article of clothing, sticker or other substrate, must be provided for. Radio-frequency sealing die 330 with flat edges 332, as shown in FIG. 8, can then be used to seal layers 30 and 90 to the substrate. In this case no excess material needs to be stripped away.

Fabric covered vinyl will not only provide stability when pre-printing, but will allow for different printing processes to be used. For example, if 100% polyester fabric is used as the outer layer, then an applique with sublimation transfer printing can be provided. Sublimation transfer printing is well-known in the art. Thus, fabric covered vinyl is advantageous because although it requires an extra die-cutting step, it provides an upscale fabric feel to the applique, and not merely a plastic feel, while adding strength, and a three-dimensional look and feel. Die 330 must be used to seal a fabric covered vinyl layer 30 which has been pre-die cut.

Figure 9:
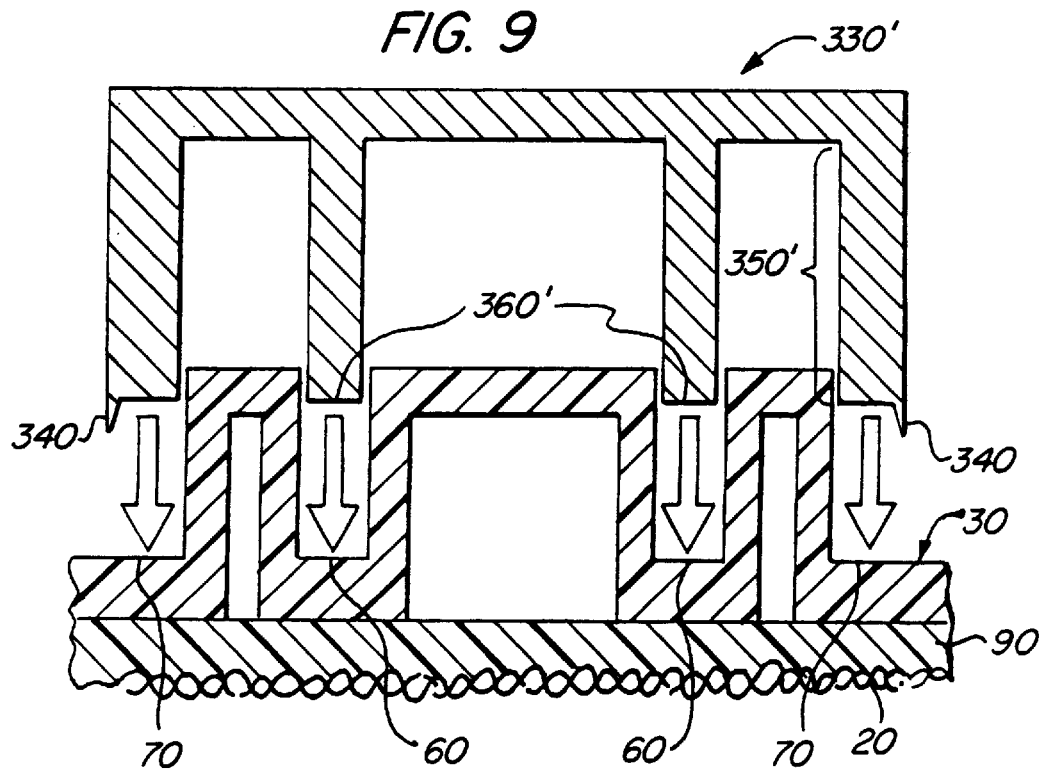
FIG. 9 is a cross-sectional view of a radio-frequency sealing and cutting die for making the applique.

As shown in FIG. 9, a radio-frequency die 330' is used to seal the backing layer 90 and the preformed layer 30 at the seal area using the flange area to an article of clothing or other substrate, such as T-shirt 20. It should be noted that the radio-frequency die 330' has a cutting edge 340 for cutting the preformed layer 30 and the backing layer 90 at the decoratively shaped perimeter 130 while sealing the layers 30, 90. This is after the step of cutting the pre-formed layer 30 from the sheet with a steel rule die 310. The radio-frequency die 330' and 330 will need to have a depth 350 sufficient so as to clear the preformed layer 30. It is understood that the radio-frequency die 330, 330' may have inner depression areas 360, 360' for sealing the layers 30, and 90 at the seal area 70 or the lowered portions 60, if any, within the perimeter of the preformed layer 30. The inner depression areas 360, 360' will need to correspond to the lowered portions 60, if any, and the seal area 70 of the preformed layer 30. It is preferred that the inner depression areas 360, 360' are provided in a single plane so that the seal area 70 and the lowered portions 60 are provided in the same plane. The inner depression areas 360, 360' assist in holding appliques 10, 10' together, particularly for large appliques 10, 10', and to enhance the strength and appearance of appliques 10, 10', especially those applied to articles of clothing or T-shirts 20.

It is understood that, for articles of clothing or T-shirts 20, other methods of attachment may be used other than radio-frequency sealing, such as sewing, heat-sealing, using solvent re-activated adhesives, gluing. The solvent activated adhesive may be advantageously used because it can be applied to the backing layer 90 before the preformed layer 30 and the backing layer 90 are sealed together, and because no heat would be required to apply the item to the article of clothing or T-shirt 20, avoiding any possible damage to the article of clothing or T-shirt 20.

A three-dimensional sticker 200, as shown in FIG. 5, can be made by cutting a preformed layer 30 from the sheet, as discussed above, and sealing the preformed layer 30 to a pressure sensitive adhesive vinyl backing 210 and release liner 220, using the dies shown in FIGS. 6–8. A three-dimensional tag can be made by forming the preformed layer 30, and sealing the preformed layer 30 to a backing layer 90, or a second preformed layer 30. In addition, a tag may be formed by sealing a second preformed layer 30 to a first preformed layer 30 and the backing layer 90, with the second preformed layer 30 being adjacent to the backing layer 90.

At least one preformed layer 30, and at least one backing layer 90 are assembled with the backing layer and seal area 70 adjacent to the flange area of the die 330, 330' and opposite the relief pattern 40. The assembly is placed on an article of clothing or T-shirt 20 or other substrate with the backing layer 90 adjacent to the article of clothing or T-shirt 20 or other substrate. It is understood that the assembly may be sealed to the substrate at the perimeter 130 of the preformed layer 30 and/or in other lowered portions 60 provided in the preformed layer 30. If encapsulated material 110 is to be provided, it should be placed between the backing layer 90 and the preformed layer 30 before the layers 30 and 90 are sealed together It is understood that more than one preformed layer 30 and/or backing layer 90 may be used for the appliques 10, 10', sticker 200 or magnet. It is further understood that the appliques 10, 10' of the invention need not be formed directly on or while sealing on the substrate.

Although the invention has been described with reference to a particular arrangement of parts, features and the like, these are not intended to exhaust all possible arrangements or features, and indeed many other modifications and variations will be ascertained by those skilled in the art.

What is claimed is:

1. A three-dimensional applique comprising:
   at least one preformed, flexible layer having a decoratively shaped perimeter and a relief pattern molded therein, the relief pattern having at least one raised portion, at least one lowered portion surrounding the raised portion, and at least one wall formed between a raised portion and a lowered portion and being substantially perpendicular to the plane in which a lowered portion of the relief pattern lies;

at least one flexible, substantially flat backing layer interposed with said preformed flexible layer, said flexible flat backing layer being fluid-impermeable;

a peripheral seal are defined by the lowered portion of said preformed flexible layer that surrounds the raised portion and said substantially flat backing layer; and said seal area, backing layer and preformed flexible layer forming at least one airtight pocket, wherein the raised portion is spaced from the flexible flat backing layer.

2. A three-dimensional applique as in claim 1 wherein the raised portion extends laterally a substantial distance from the plane in which a lowered portion lies.

3. A three-dimensional applique as in claim 1 wherein said one flexible flat layer further is printed and said one preformed flexible layer further is transparent.

4. A three-dimensional applique as in claim 1 wherein said preformed layer further comprises a fabric covered outer surface.

5. A three-dimensional applique as in claim 3 wherein said one flexible flat backing layer further is reflective and said one preformed flexible layer further is transparent.

6. A three-dimensional applique as in claim 3 wherein said one preformed flexible layer further is printed.

7. A three-dimensional applique as in claim 2 further comprising an encapsulated material in an air-tight pocket between a preformed layer and a backing layer.

8. A three-dimensional applique as in claim 3 wherein said peripheral seal further includes an adhesion promoter disposed between a lowered portion of the relief pattern surrounding a raised portion and said substantially flat backing layer.

9. A three-dimensional applique as in claim 7 wherein the encapsulated material comprises electronic parts, such as sound, music or light-up modules.

10. A three-dimensional applique as in claim 3 further comprising an encapsulated material in an air-tight pocket between a preformed layer and a backing layer.

11. A process for producing three-dimensional appliques comprising the steps of:

vacuum forming an assembly from at least one preformed, flexible layer having a decoratively shaped perimeter, and a relief pattern molded therein, the relief pattern having at least one raised portion, at least one lowered portion surrounding the raised portion, and at least one wall formed between a raised portion and a lowered portion and being substantially perpendicular to the plane in which a lowered portion of the relief pattern lies, and at least one flexible, substantially flat backing layer that is fluid impermeable; and forming a peripheral seal between the preformed layer and backing layer so that at least one airtight pocket is formed therebetween.

12. A process as in claim 11 wherein the assembly further includes loose decorative material encapsulated between the layers.

13. A process as in claim 11 wherein the assembly further includes an adhesion promoter disposed between a lowered portion of the relief pattern surrounding a raised portion and said backing layer.

14. A process for producing three-dimensional appliques comprising the steps of:

vacuum treating a first flexible layer to mold a relief having a lowered portion defined within a decoratively shaped perimeter and a raised portion surrounded by the lowered portion and extending upward therefrom;

juxtaposing a substantially flat, flexible and fluid impermeable second layer with the lowered portion of the first layer, thereby forming a compartment defined between the raised portion of the first layer and the second layer; and peripherally sealing the first and second layers to have the compartment airtight.

15. A process as in claim 11 where the assembly further includes encapsulated material in the air-tight pocket.

16. A process as in claim 15 wherein the encapsulated material is electronic parts selected from the group consisting of sound, music and light-up modules.

17. An article of clothing comprising at least one applique according to claim 1 wherein said applique is fixed to an article of clothing so that a backing layer is adjacent to the article of clothing.

18. An article of clothing as in claim 17 wherein said applique is fixed to an article of clothing so that portions of the decoratively shaped perimeter remain loose.

19. An article of clothing as in claim 17 wherein a heat-activated adhesive is disposed between an article of clothing and said backing layer.

20. A three-dimensional sticker comprising at least one applique according to claim 1 wherein said applique is affixed to an adhesive backing having a release liner.

21. A three-dimensional sticker comprising an applique made by the process of claim 16 wherein the assembly further comprises adhesive backing having a release liner, the adhesive backing being positioned adjacent to the backing layer.

22. A three-dimensional tag comprising at least two three-dimensional appliques according to claim 1 fixed to each other with their backing layers adjacent to each other.

23. A three-dimensional tag as in claim 22 wherein the three dimensional appliques made by the process of claim 16.

24. The method defined in claim 14, further comprising the step of attaching the flat, flexible second layer to a substrate selected from the group consisting of clothing, wool, stickers, hats, and magnets.

25. A tag as in claim 22 further comprising encapsulated materials in the air-tight pocket.

26. A three-dimensional magnet comprising at least one three-dimensional applique according to claim 1 and further comprising a magnet affixed to said applique.

* * * * *